United States Patent [19]
Vobejda

[11] Patent Number: 4,742,638
[45] Date of Patent: May 10, 1988

[54] ARTIFICIAL FISHING LURE

[76] Inventor: Donald J. Vobejda, 1263-21st Ave. SW., Cedar Rapids, Iowa 52404

[21] Appl. No.: 56,055

[22] Filed: Jun. 1, 1987

[51] Int. Cl.$^4$ ............................................. A01K 85/01
[52] U.S. Cl. ..................................... 43/42.06; 43/44.99
[58] Field of Search ................. 43/42.06, 42.33, 42.19, 43/44.99

[56] References Cited

U.S. PATENT DOCUMENTS

| 1,390,601 | 9/1921 | Caldwell | 43/42.06 |
| 2,465,127 | 3/1949 | Stark | 43/44.99 |
| 2,560,733 | 7/1951 | Morris | 43/42.06 |
| 2,709,317 | 5/1955 | Pease, Sr. | 43/42.06 |
| 2,769,268 | 11/1956 | Miller | 43/42.06 |
| 2,922,244 | 1/1960 | Binner, Sr. | 43/42.06 |
| 3,124,891 | 3/1964 | Van Sant | 43/42.06 |

Primary Examiner—Nicholas P. Godici
Assistant Examiner—Karen Skillman
Attorney, Agent, or Firm—James C. Nemmers

[57] ABSTRACT

An artificial fishing lure which provides a means for containing a liquid scent and dispensing that scent in metered amounts as the lure is drawn through the water. The lure contains a propeller at its rear end which turns as the lure is pulled through the water. Turning of the propeller conveys the liquid scent contained within the lure and disperses it into the water to attract fish to the lure.

5 Claims, 1 Drawing Sheet

ARTIFICIAL FISHING LURE

BACKGROUND OF THE INVENTION

Numerous artificial fishing lures are known and commercially available. Over the years, many others have been commercially available as the fisherman attempts to find the perfect lure that will enable him to catch the big ones. These known artificial lures are of wide variety of types and designs and use shapes, colors and spinners of all types in an effort to attract a fish to the lure. In recent years there has been added to the arsenal of the fisherman scents that are designed to be used in connection with artificial lures in order to more easily and quickly attract fish to the lure. As a result of the development of these scents, numerous artificial lures have been designed in an effort to provide a way to utilize these scents in the most efficient manner and to provide the greatest attraction to the fish. For example, Miller U.S. Pat. No. 2,769,268 discloses a lure in which material for attracting fish is dispensed by reason of a rotating mechanism. Numerous other patents disclose some form of providing for the discharge of a liquid scent from a hollow lure, but none of them provide a means which can efficiently and controllably meter the liquid lure from the rear of the artificial lure to lead a trail of scent for the fish to follow, hopefully to the lure itself. There is therefore a need for an improved artificial lure which can provide an efficient means of metering and dispensing a liquid scent into the water as the lure is pulled through the water by the fisherman.

SUMMARY OF THE INVENTION

The invention consists of an artificial lure that has a hollow body suitable for containing a liquid scent. A propeller is mounted at the rear of the lure and is rotatable on a shaft that extends inside of the hollow body. The shaft contains spiral grooves that extend from inside of the hollow body of the lure to the exterior. Thus, as the lure is pulled through the water, the propeller will rotate and rotate the shaft. The liquid scent inside of the body will be carried in the spiral groove in the shaft in a metered amount outside of the body of the lure as the shaft rotates.

DESCRIPTION OF THE PREFERRED EMBODIMENT OF THE INVENTION

Figure 1:
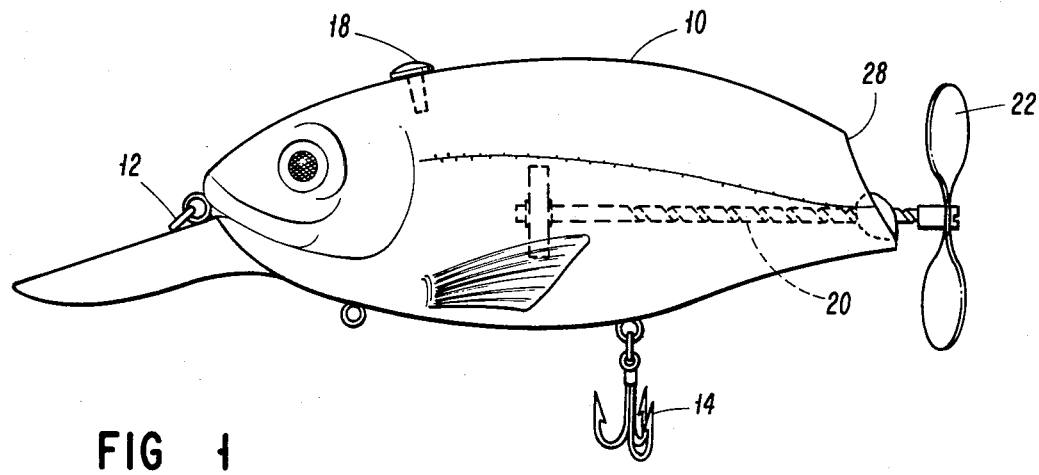
FIG. 1 is a side elevation view of a lure constructed according to the principles of the invention.

Referring to the drawings, the lure has a hollow body 10 of any desired design or shape. The design or shape of the lure itself does not form a part of the invention. As is well known to those skilled in the art, the front of the lure has a ring 12 to attaching the fishing line to the lure. The lure also is provided with one or more hooks 14.

An opening 16 is formed in the top of the hollow body 10 which opening is closeable by a suitable plug 18 that is removeable. The opening 16 provides access to the reservoir provided by the hollow body 10, and provides for filling of the hollow body 10 with a suitable liquid scent of any suitable type.

A shaft 20 is mounted longitudinally inside of the hollow body 10, the shaft 20 extending outside of the body 10 to the rear where it is connected to a small propeller 22. The forward part of the shaft is mounted in a suitable bearing 24, and a bearing 26 is also provided in the wall 28 at the rear of the body 10 through which wall 28 the shaft extends. The propeller 22 may be made removeable so that it can be replaced if damaged. The bearing 24 and 26 are such that they allow free rotational movement of shaft 20 while preventing its axial movement.

Figure 2:
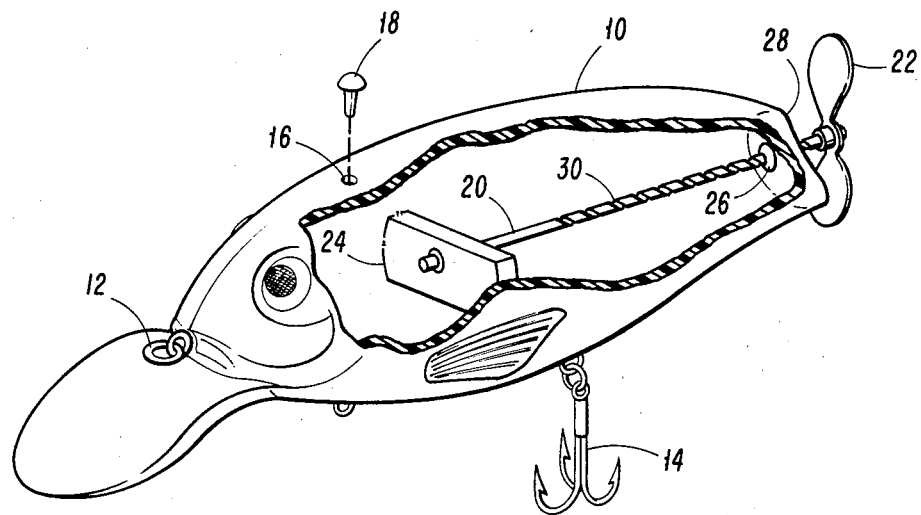
FIG. 2 is a perspective view of the lure, partially broken away to show the liquid metering device.

As best seen in FIG. 2, shaft 20 is provided with a spiral groove 30 which spiral groove extends from the inside of the hollow body 10 to the outside of the wall 28 of body 10.

When not in use, the plug 18 is removed so that the opening 16 can be used to fill the reservoir provided by the hollow body 10 with a liquid fish scent. When the desired amount of the scent has been added to the reservoir provided by hollow body 10, the plug 18 is replaced and the lure is ready for use. When the lure is cast into the water, the scent will remain in the reservoir provided by the hollow body 10. However, as the lure is retrieved and moves through the water, the propeller 22 will be driven which in turn rotates shaft 20. Because of the spiral groove 30 formed in the shaft 20, the liquid scent is metered out through the rear wall 28 of the lure. Thus, as the lure is pulled through the water, the fish scent contained in the reservoir provided by body 10 is metered out of the lure body and dispensed throughout the water to the rear of the lure. This attracts the fish to the lure. Because the scent is metered out slowly and controllably, the scent will not be wasted and the lure can be used repeatedly before it becomes necessary to refill the reservoir provided by the hollow body 10.

If desired, the hollow body 10 of the lure can be made of clear plastic or other material or at least have a strip of clear plastic formed in it so that the user can easily observe the level of scent. Also, if the lure body is of clear plastic, different colored scents can be used thereby enabling the user to change the color of the lure. This has certain advantages since different colors attract different fish.

Having thus described the invention in connection with a preferred embodiment of it, it will be evident to those skilled in the art that various revisions and modifications can be made to the preferred without departing from the spirit and scope of the invention. It is my intention however that all such revisions and modifications as are obvious to those skilled in the art will be included within the scope of the following claims.

What is claimed is:

1. An artificial lure for fishing comprising a main body having a front and a rear and having a configuration that resembles an object that is attracted to fish, the body defining a chamber that is normally liquid tight and having a closeable opening that provides access to the chamber for filling the chamber with liquid, a rotatable shaft having its inner end mounted inside of said chamber and its outer end extending through the rear of the body to the outside, a propeller secured to the outer end of the shaft so as to be rotatable with the shaft, means formed on said shaft so that as the shaft rotates liquid in the chamber will be controllably discharged to the outside of the body of the lure, a hook affixed to the outside of the body of the lure, and means near the front of the body to provide for attachment of the lure to a fishing line.

2. The artificial lure of claim 1 in which the shaft is freely rotatable by action of the propeller as the lure is pulled through the water.

3. The artificial lure of claim 2 in which the shaft is formed with a spiral groove along its outer surface which groove extends rearwardly from inside the chamber to outside of the body.

4. The artificial lure of claim 1 in which the main body is formed of transparent material so that a liquid of the desired color can be placed in the chamber of the main body.

5. The artificial lure of claim 3 in which the main body is formed of transparent material so that a liquid of the desired color can be placed in the chamber of the main body.

* * * * *